United States Patent Office 3,123,150
Patented Mar. 3, 1964

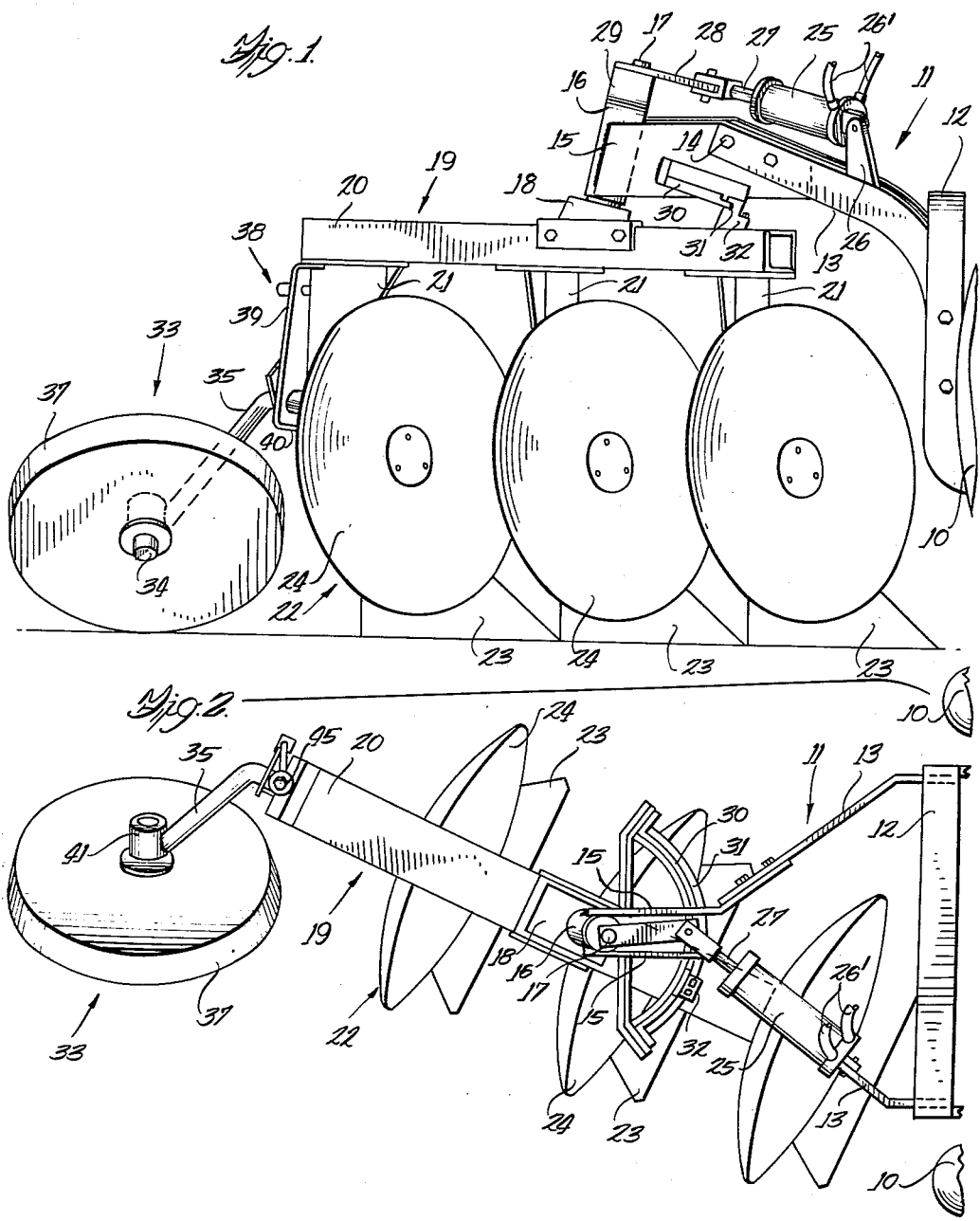

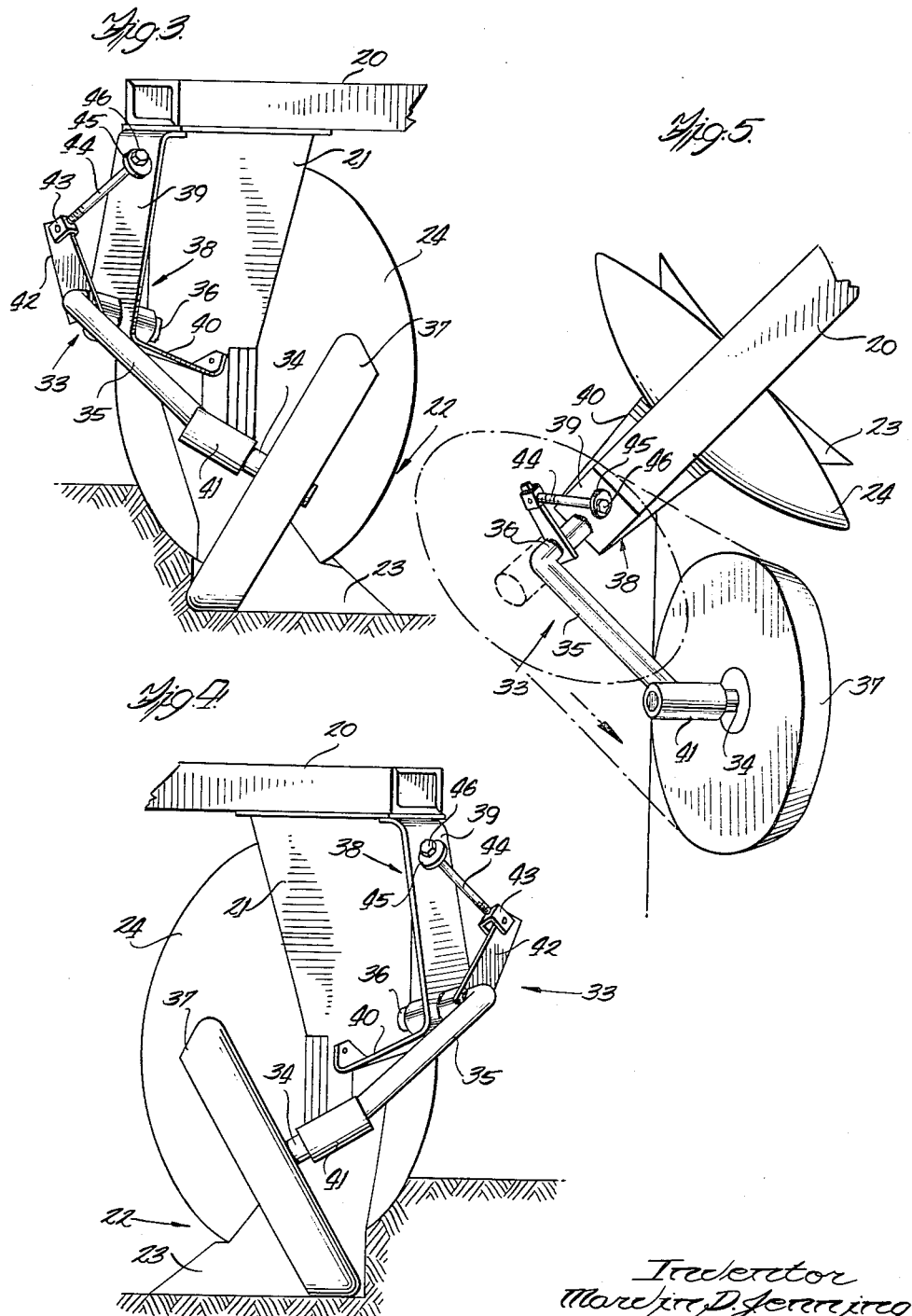

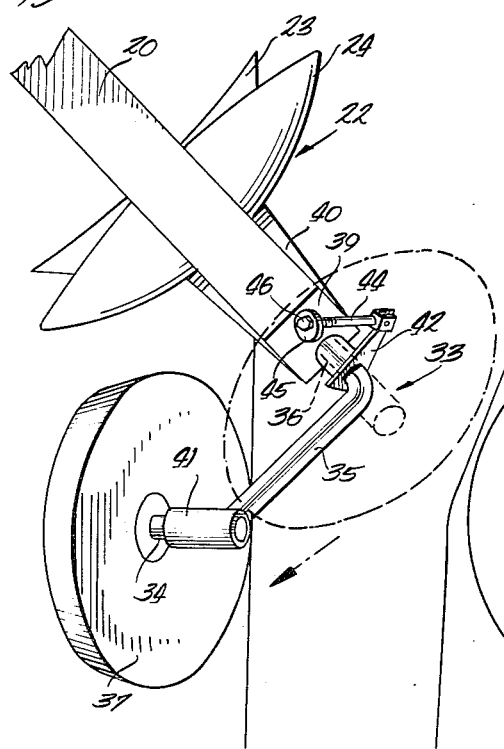
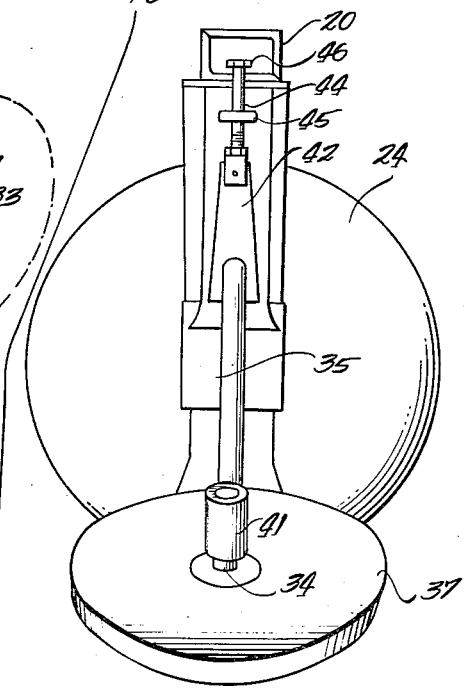
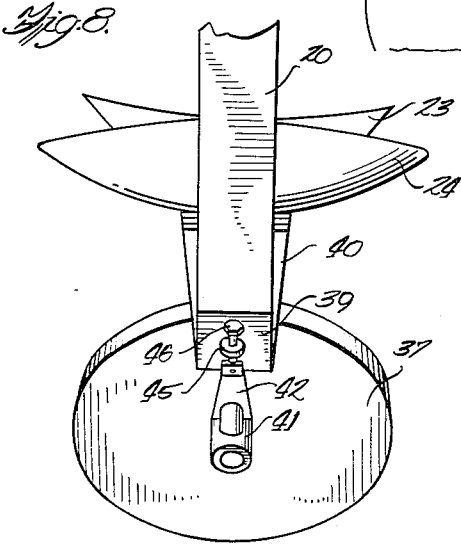

3,123,150
REAR WHEEL MOUNTING FOR TWO-WAY PLOW
Marvin D. Jennings, Naperville, Ill., assignor to International Harvester Company, Chicago, Ill., a corporation of New Jersey
Filed Apr. 9, 1962, Ser. No. 186,024
5 Claims. (Cl. 172—219)

This invention relates to agricultural implements and particularly to plows. More specifically, the invention concerns a reversible or two-way plow.

An object of the present invention is the provision of a two-way plow of novel construction and improved operating characteristics.

Another object of the invention is the provision of a reversible plow of the type having a tool-carrying frame that is shifted or swung laterally about a generally vertical axis between alternate operating positions, and having a furrow wheel mounted on the rear of the shifting frame in such a way that the furrow wheel shifts with the tool-carrying frame but also moves relative to said frame to serve as a furrow wheel in either of the operating positions of the plow.

Another object of the invention is the provision of a two-way or reversible disk plow of the type having a plow carrying frame laterally swingable between positions for alternate right- and left-hand plowing and vertically movable between operating and transport positions wherein a single furrow wheel assembly mounted on the rear end of the plow carrying frame is alternately moved, by engagement of the wheel with the ground upon lowering the plow to dispose the wheel in the furrow formed by the plow unit in either of its alternate plowing positions.

Other objects and advantages of the invention will become clear from the following detailed description when read in conjunction with the accompanying drawings wherein:

FIGURE 1 is a view in side elevation of a reversible or two-way plow according to this invention adapted for mounting upon a tractor to be transported thereby;

FIGURE 2 is a plan view of the structure shown in FIGURE 1;

FIGURE 3 is an elevation showing a detail of the rear end of the plow of this invention with the plow carrier or tool-carrying frame in position for right-hand plowing;

FIGURE 4 is a detail similar to FIGURE 3 showing the rear end of the plow frame and the furrow wheel carried thereby in the left-hand operating position;

FIGURE 5 is a plan view of the structure shown in FIGURE 3;

FIGURE 6 is a plan view of the structure shown in FIGURE 4;

FIGURE 7 is a rear elevation of the tool-carrying frame showing the neutral or non-operating position of the disks and furrow wheel when the plow has been lifted, and FIGURE 8 is a plan view of the structure shown in FIGURE 7.

The implement with which this invention is concerned is a reversible or two-way plow in which the same plow units operate alternately for right- and left-hand plowing and is shown in FIGURES 1 and 2 as being adapted for mounting upon the rear of a tractor having the rear drive wheels 10 by which the implement is propelled and by which it can be carried in a raised position above the ground for transport purposes and for turning at the end of a field, such lifting means being of conventional construction and not shown. The implement comprises a main supporting frame 11 including a hitch structure 12 adapted for connection to complementary hitch means, not shown, carried by the tractor.

The implement of this invention is efficient and economical in construction, the main supporting frame 11 comprising laterally spaced frame bars 13 affixed at their forward ends to hitch structure 12 and converging rearwardly for rigid connection by bolts 14 with a pair of spaced plates 15.

Between the ends of plates 15 there is secured, as by welding, a generally vertically extending bearing 16 in which is rotatably received a spindle 17, the lower end of which is affixed to a bracket 18 secured to and forming a part of a tool-carrying subframe 19.

Subframe 19 comprises an elongated beam 20 upon which bracket 18 is mounted medially of its ends so that a part of the subframe 19 extends forwardly of the pivot axis of spindle 17 and a substantial part thereof extends rearwardly. Tool standards 21 are secured to and depend from beam 20 at spaced locations therealong, and each standard has mounted on its lower portion a plow unit 22, the structural details of which form no part of this invention. However, it may be understood that each plowing unit 22 has a lower symmetrical earth-penetrating share section 23 and a disk section 24, the plane of each earth working unit being normal to the beam 20.

In FIGURES 1 and 2 the tool-carrier 19 is shown disposed diagonally to the direction of travel of the implement in position for right-hand plowing. Lateral swinging of the carrier 19 about the forwardly tilted axis of spindle 17 disposes the tool-carrying frame on the opposite diagonal, as indicated in FIGURES 4 and 6, for left-hand plowing. The tool carrier is shifted laterally between its alternate operating positions by the provision of a hydraulic cylinder 25 anchored to a lug 26 affixed to one of the bars 13, and receiving fluid under pressure in any well known manner from the tractor through hose lines 26'. A piston rod 27, slidable in the cylinder is pivotally connected to one end of a lever 28, the other end of which is secured to the upper end of spindle 17, and separated from bearing sleeve 16 by a collar 29.

Extension of piston rod 27 in cylinder 25 from the position shown in FIGURE 2 shifts the tool-carrier 19 to the opposite diagonal for left-hand plowing.

The forward end of the tool-carrier is supported and guided in its lateral shifting movement by the provision of a semi-circular track 30, affixed to the plates 15 and having a flange 31 engageable with a bracket 32 secured to the beam 20.

The two-way plow of this invention is provided with a novel tail or furrow wheel assembly 33 which is mounted upon the subframe 19 and swings laterally to opposite sides of a center line in the direction of travel of the plow, as indicated in FIGURES 5 and 6, for example. As shown particularly well in FIGURES 3 to 6 the wheel assembly is carried by and swings laterally with the rear end of the beam 20 but also swings in the opposite direction with respect to the tool-carrier in order to dispose the unit in proper position to ride in the furrow formed by the plow units when arranged for either right or left-hand plowing.

The furrow wheel assembly 33 comprises a stub axle 34 secured to the end of a crank arm 35 having at its upper end a forwardly and downwardly inclined axle section 36. A furrow wheel 37, disposed at an angle to the vertical, is mounted on the stub axle 34, and the forwardly and downwardly bent axle section 36 is rotatably mounted in an L-shaped bracket 38 having an upper section 39 affixed at its upper end to the beam 20 and a lower forwardly and downwardly extending section 40 affixed at its forward end to the rearmost plow unit 22.

Stub shaft 34 is rotatable in a bearing 41 which is affixed to crank arm 35 and in the operating position of the implement is angled downwardly and outwardly.

When the plow is raised above the ground to be transported the tool-carrier is shifted to a neutral central position indicated in FIGURES 7 and 8 wherein the tool-carrier 19 is parallel to the direction of travel. In this neutral position since the wheel-carrying crank arm 35 is free to swing in an arc laterally about the axis of axle section 36, the wheel 37 falls by gravity to the centered position of FIGURES 7 and 8 with the arm 35 hanging generally vertically. When turning at the end of a field to proceed in the opposite direction the plow is raised and the tool-carrier shifted laterally to its alternate operating position. When this occurs wheel 37 swings to the bottom of its arc of travel as shown in FIGURES 7 and 8 until the plow carrier has reached its alternate plowing position. The plow is then lowered, and upon engagement of wheel 37 with the ground, due to the forwardly and downwardly tilted angle of axle 36 in the vertical plane of tool carrier 19, the wheel-carrying arm 35 is swung upwardly from the dotted to the solid line position in position to engage the furrow wall made by the plow units 22, the position for right-hand plowing being illustrated in FIGURE 3 and for left-hand plowing in FIGURE 4. Such a structure eliminates the need for the customary expensive and complicated mechanism required on conventional plows of this type for reversing the position of the furrow wheel when the plow is shifted to one of its alternate operating positions.

To limit the upward movement of the wheel 37 relative to the tool-carrier stop means is provided including an arm 42 affixed to the axle section 36 and pivotally connected at its end to a clevis 43 having a threaded opening therein to receive the threaded end of a rod 44 slidable in a swivel 45 affixed to section 39 of bracket 38 and having a head 46 thereon. Rod 44 is adjustable with respect to clevis 43 to regulate the angle of wheel 37 with respect to the ground.

When the tool-carrier has swung to the right diagonal for right-hand plowing as indicated in FIGURE 5, engagement of wheel 37 with the ground upon lowering the plow forces arm 35 and wheel 37 upwardly to the right side of the tool-carrier from the dotted to the solid line positions by virtue of the forwardly and downwardly tilted angle of axle 36. Upon reversing the direction of operation to left-hand plowing as indicated in FIGURE 4, the sliding of rod 44 in swivel 45 will cause crank arm 35 and wheel 37 to assume the central neutral position of FIGURE 7, and upon completion of the shifting of tool-carrier 19 to the left-hand plowing position of FIGURES 4 and 6, engagement of wheel 37 with the ground by virtue of the angle assumed by axle section 36, moves up the left-hand section of the arc of travel of the arm and wheel until stopped by head 46 of rod 44 engaging swivel 45. The wheel is then in position for riding in the furrow made by the plow in its left-hand operating position.

It is believed that the constructions and operation of the novel two-way plow and furrow wheel unit of the present invention will be clearly understood from the foregoing description. It should likewise be understood that the invention has been described in its preferred embodiment only, and that modifications may be made in the invention without departing from the spirit thereof or the scope of the appended claims.

What is claimed is:

1. A two-way plow comprising a traveling supporting frame adapted to be vertically moved between operating and transport positions of the plow, a generally vertically extending pivot member carried by the supporting frame adjacent its rear end, a generally horizontally extending diagonally disposable tool-carrying frame having a plow unit thereon arranged to form a furrow in the ground, means pivotally connecting said tool-carrying frame to said pivot member medially of the ends of the tool-carrying frame, whereby a substantial portion of the latter projects rearwardly beyond said pivot member, said tool-carrying frame being laterally swingable about the axis of said pivot member between opposite diagonals for alternate right and left-hand plowing, an arm pivotally mounted on the rear end of the tool-carrying frame for lateral movement therewith and free swinging relative thereto in an arcuate path in a generally vertical plane, and a furrow wheel carried by the arm and swingable therewith in a direction opposite to the direction of movement of the tool-carrying frame to dispose the wheel in the furrow formed by the plow unit in either of its operating positions, the pivot axis of said arm being tilted forwardly and downwardly in a vertical plane through said tool-carrying frame so that, upon engagement of the wheel with the ground when the plow is lowered, the wheel is automatically moved by the pressure of the ground into operating position behind the plow unit in either of the alternate operating positions of said unit.

2. In a two-way plow of the type having a main frame and a diagonally disposable tool-carrying subframe mounted on the main frame for lateral swinging about a generally vertical axis between opposite diagonals for alternate right and left-hand plowing, the combination of a furrow wheel assembly comprising a crank axle having a wheel-carrying arm portion pivotally mounted on the subframe for lateral swinging therewith and for additional lateral swinging movement in a generally vertical plane about the pivot of said arm portion on the subframe and in a direction opposite to the direction of swinging movement of said rear end of the subframe to dispose the wheel in a central position relative to the path of travel of the plow so that the wheel operates as a furrow wheel for both right and left-hand plowing positions of the tool-carrying subframe, said pivotal mounting of the crank axle on the subframe being on an axis tilted forwardly and downwardly in the vertical plane of the subframe.

3. The invention set forth in claim 2 wherein stop means is connected between the subframe and the crank axle to limit the lateral swinging of the crank axle in both directions.

4. In a two-way plow of the type having a main frame adapted to be vertically moved between operating and transport positions and a diagonally disposable tool-carrying subframe mounted on the main frame for lateral swinging about a generally vertical axis between opposite diagonals for alternate right and left-hand plowing, the combination of a supporting member pivotally mounted on the rear end of the subframe for lateral swinging therewith, said supporting member having a generally vertical portion freely swingable in an arc laterally relative to the subframe in opposite directions to alternate positions approaching the horizontal, a wheel-carrying portion at its lower end and an axle section at its upper end for said pivotal mounting on the subframe, the axis of said axle section being tilted forwardly and downwardly relative to the subframe.

5. In a two-way plow of the type having a main frame adapted to be vertically moved between operating and transport positions and a diagonally disposable tool-carrying subframe mounted on the main frame for lateral swinging about a generally vertical axis between opposite diagonals for alternate right and left-hand plowing, the combination of a furrow wheel assembly comprising a crank axle having a wheel-carrying arm portion pivotally mounted on the subframe for free lateral swinging movement relative thereto in a generally vertical transverse plane to opposite sides of a central neutral position, the mounting of said wheel-carrying arm portion on the subframe being such that upon vertical movement of the main frame to its transport position said wheel-carrying arm portion swings downwardly by gravity and upon lowering the main frame to one of the alternate operating positions of said tool-carrying subframe said wheel-carrying arm is predisposed to swing laterally by the pressure of the ground against the wheel to dispose the wheel in a position to operate as a furrow wheel for said one of the alternate operating positions of the tool-carrying subframe.

References Cited in the file of this patent
UNITED STATES PATENTS

| | | |
|---|---|---|
| 2,834,274 | Barrett | May 13, 1958 |
| 2,949,161 | Campbell | Aug. 16, 1960 |
| 2,999,548 | Wenzel | Sept. 12, 1961 |